US012794049B2

(12) United States Patent
Shimizu et al.

(10) Patent No.: US 12,794,049 B2
(45) Date of Patent: Nov. 10, 2026

(54) POWER STORAGE DEVICE

(71) Applicant: Panasonic Intellectual Property Management Co., Ltd., Osaka (JP)

(72) Inventors: Kazumichi Shimizu, Osaka (JP); Kazutoshi Kohira, Hyogo (JP); Shinya Geshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 875 days.

(21) Appl. No.: 17/760,107

(22) PCT Filed: Feb. 19, 2021

(86) PCT No.: PCT/JP2021/006493
§ 371 (c)(1),
(2) Date: Aug. 4, 2022

(87) PCT Pub. No.: WO2021/172233
PCT Pub. Date: Sep. 2, 2021

(65) Prior Publication Data

US 2023/0062553 A1 Mar. 2, 2023

(30) Foreign Application Priority Data

Feb. 28, 2020 (JP) ................................ 2020-034450

(51) Int. Cl.
*H01M 50/183* (2021.01)
*H01M 10/04* (2006.01)
(Continued)

(52) U.S. Cl.
CPC ..... *H01M 50/183* (2021.01); *H01M 10/0481* (2013.01); *H01M 50/107* (2021.01); *H01M 50/152* (2021.01); *H01M 50/533* (2021.01)

(58) Field of Classification Search
CPC ........... H01M 50/183; H01M 10/0481; H01M 50/107; H01M 50/152; H01M 50/533
See application file for complete search history.

(56) References Cited

U.S. PATENT DOCUMENTS 6,524,739 B1 * 2/2003 Iwaizono ............ H01M 50/562 429/185
8,486,546 B2 * 7/2013 Kim .................. H01M 50/3425 429/82
(Continued)

FOREIGN PATENT DOCUMENTS

CN 115004461 A 9/2022
JP 63-075948 U 5/1988
(Continued)

OTHER PUBLICATIONS

English Translation of Chinese Office Action dated Feb. 29, 2024 for the related Chinese Patent Application No. 202180009996.0.
(Continued)

*Primary Examiner* — Jeffrey T Barton
*Assistant Examiner* — Anna G. Newell
(74) *Attorney, Agent, or Firm* — Rimon P.C.

(57) ABSTRACT

A power storage device includes an electrode group, a case having an opening, and a sealing body. The sealing body includes an annular sealing plate, a terminal cap, and an insulating gasket. The sealing plate includes a first wall portion with a tubular shape and a flange portion extending from one end of the first wall portion outward in a radial direction of the first wall portion. The terminal cap includes a cover portion with a plate shape and a crimp portion connected with a periphery of the cover portion. The cover portion closes an opening of the first wall portion surrounded by another end of the first wall portion. The gasket includes a second wall portion with a tubular shape facing an outer peripheral surface of the first wall portion and an annular base disposed between the cover portion and the another end of the first wall portion. The crimp portion includes a third wall portion with a tubular shape surrounding at least a part of the second wall portion. The third wall portion compress the second wall portion. A peripheral portion of the sealing plate is joined to an opening end portion of the case.

13 Claims, 7 Drawing Sheets

(51) Int. Cl.

| | |
|---|---|
| ***H01M 50/107*** | (2021.01) |
| ***H01M 50/152*** | (2021.01) |
| ***H01M 50/533*** | (2021.01) |

(56) References Cited

U.S. PATENT DOCUMENTS

| | | | | |
|---|---|---|---|---|
| 2003/0186118 | A1* | 10/2003 | Uyama | H01M 50/167 429/174 |
| 2010/0266893 | A1 | 10/2010 | Martin et al. | |
| 2012/0058390 | A1* | 3/2012 | Obayashi | H01M 50/553 29/877 |
| 2018/0130995 | A1* | 5/2018 | Nemoto | H01M 50/567 |
| 2018/0205044 | A1* | 7/2018 | Urushihara | H01M 4/06 |
| 2023/0060460 | A1 | 3/2023 | Shimizu et al. | |

FOREIGN PATENT DOCUMENTS

| | | | |
|---|---|---|---|
| JP | 63-162447 | U | 10/1988 |
| JP | 2004-241171 | | 8/2004 |
| JP | 2013-242975 | A | 12/2013 |

OTHER PUBLICATIONS

International Search Report of PCT application No. PCT/JP2021/006493 dated Apr. 27, 2021.

* cited by examiner

POWER STORAGE DEVICE

CROSS-REFERENCE TO RELATED APPLICATIONS

This application is a U.S. national stage application of the PCT International Application No. PCT/JP2021/006493 filed on Feb. 19, 2021, which claims the benefit of foreign priority of Japanese patent application No. 2020-034450 filed on Feb. 28, 2020, the contents all of which are incorporated herein by reference.

TECHNICAL FIELD

The present disclosure relates to power storage devices.

BACKGROUND ART

Power storage devices are widely used as drive sources of vehicles, electronic devices, and the like. In general, a power storage device includes a case with an opening and a sealing body closing the opening of the case. The case accommodates therein an electrode group including a first electrode and a second electrode. In cases where the first electrode is electrically connected to the case, the second electrode is coupled to a terminal portion disposed at the sealing body. The terminal portion needs to be electrically insulated from the case.

PTL 1 teaches a non-aqueous electrolyte secondary battery including a battery case having a tubular shape with a bottom, a power generation element accommodated in the case, and a sealing plate closing an opening of the battery case. The sealing plate includes a flange portion formed approximately in conformance with the shape of the opening of the battery case, a boss portion that holds gas discharge means by which a boss portion breaks if pressure inside the battery case reaches a predetermined value, and a protrusion portion protruding inward into the boss portion. A cap also serving as one of the electrode terminals, an upper thin metal plate, a lower thin metal plate, and a gasket is disposed between the protrusion portion and the bent portion at which one end of the boss portion is bent inward.

CITATION LIST

Patent Literature

PTL 1: Japanese Patent Laid=Open Publication No. 2004-241171

SUMMARY OF THE INVENTION

Technical Problem

However, the formation of the boss portion and the protrusion portions described above in the sealing plate disclosed in PTL 1 requires complicated processing. For example, the sealing plate in which the boss portion and one side of the protrusion portion have been formed needs to be further processed for forming the other side by welding and forging. Production of such a sealing plate with high accuracy will cost higher. Thus, an object of the present disclosure is to provide a power storage device including a sealing body processed easily.

Solution to Problem

One aspect of the present disclosure relates to a power storage device that includes: an electrode group including a first electrode and a second electrode; a case accommodating the electrode group therein, the case having an opening; and a sealing body closing the opening of the case. The sealing body includes an annular sealing plate having an annular shape, a terminal cap, and a gasket provided between the sealing plate and the terminal cap, the gasket having an insulating property. The sealing plate includes a first wall portion having a tubular shape and a flange portion extending from one end of the first wall portion outward in a radial direction of the first wall portion. The terminal cap includes a cover portion having a plate shape and a crimp portion connected with a periphery of the cover portion, the cover portion closing an opening surrounded by another end of the first wall portion. The gasket includes a second wall portion having a tubular shape facing an outer peripheral surface of the first wall portion and an annular base disposed between the another end of the first wall portion and the cover portion. The crimp portion includes a third wall portion having a tubular shape surrounding at least a part of the second wall portion. The third wall portion compress the second wall portion by pressing the second wall portion inward along the radial direction of the first wall portion. A peripheral portion of the sealing plate is joined to an opening end of the case. The terminal cap is electrically connected to the first electrode. The case is electrically connected to the second electrode.

Advantageous Effect of Invention

In accordance with the present disclosure, a protrusion portion protruding from the flange portion is not required, allowing the sealing plate to be produced easily. This configuration provides a power storage device including a sealing body processed precisely and with low cost.

DESCRIPTION OF EMBODIMENTS

Figure 1:
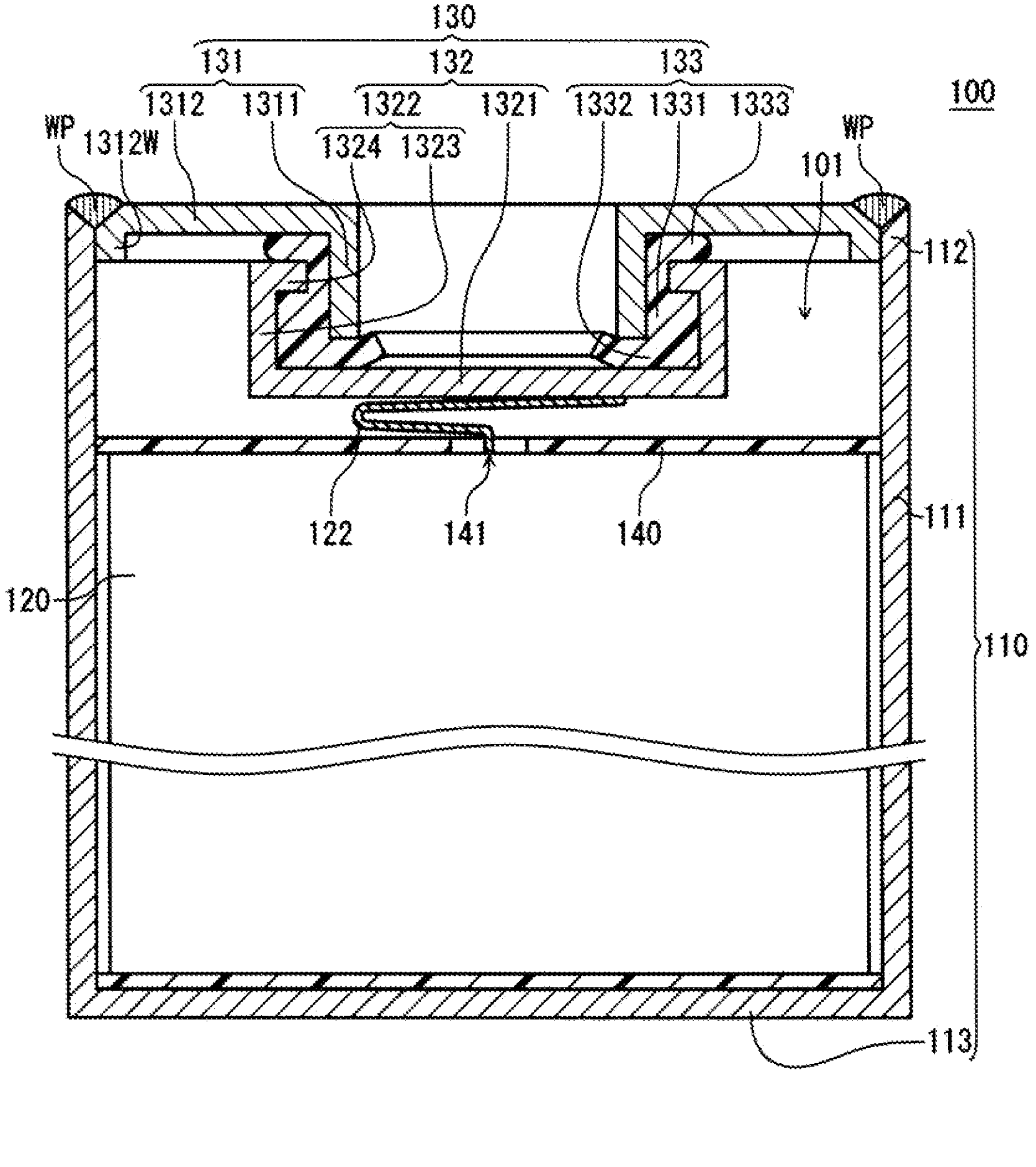
FIG. 1 is a cross-sectional view of one example of a power storage device according to an exemplary embodiment of the present disclosure.

A power storage device according to one aspect of the present disclosure includes an electrode group including a first electrode and a second electrode, a case that accommodates the electrode group and has an opening, and a sealing body that closes the opening of the case. The case has, e.g., a cylindrical shape. The case includes, for example, a tubular portion, an opening-end portion connected to one end of the tubular portion and corresponds to the opening, and a bottom portion that closes another end of the tubular portion. The electrode group is formed by winding, for example, the first and second electrodes and a separator provided between the electrodes. In cases where the power storage device is a battery, one of the first and second electrodes is a positive electrode while the other is a negative electrode.

The sealing body includes a sealing plate with an annular shape, a terminal cap, an insulating gasket interposed between the sealing plate and the terminal cap. A peripheral portion of the annular sealing plate is joined with an opening-end portion of the case, thereby causing the sealing body to hermetically seal the opening of the case. The sealing plate joined with the case has the same polarity as the case. The sealing plate has electrical conductivity, for example, and is made of metal. In cases where the case is made of metal as well, both the case and the sealing plate may be made of the same metal. This configuration enhances the reliability of a joining portion between the sealing body and the case. The case coupled to the negative electrode may be made of metal, such as, iron, stainless steel, copper, aluminum, nickel, or alloy of these metals. being insulated from the sealing plate by the gasket, the terminal cap may have a polarity different from that of the case. The terminal cap is electrically connected to the first electrode while the case is electrically connected to the second electrode. The terminal cap has electrical conductivity and is made of metal, for example. In cases where the case as well is made of metal, the metal composing the terminal cap may be the same material as a lead, which will be described later. This configuration, when joining the lead and the terminal cap, results in increased reliability of their joining portion.

The annular sealing plate includes a first wall portion with a tubular shape and a flange portion that extends from one end of the first wall portion outward in a radial direction (hereinafter, referred to as radial direction D) of the first wall portion. That is, the peripheral portion of the sealing plate constitutes the peripheral portion of the flange portion. The peripheral portion of the flange portion is joined to the opening of the case. The peripheral portion of the flange portion may extend in the direction in which the sealing body faces the electrode group. That is, a shallow tubular wall extending inside the case may be formed at the peripheral portion of the flange portion. This configuration allows the dimension of a molten mark (a depth of a molten mark) to be easily enlarged in the height direction when the sealing body is joined to the opening-end portion of the case. This results in an increase in tightness of the fixing of the sealing body to the case. The tubular wall may extend outside the case. This configuration prevents thermal energy generated when joining the sealing body and the case from transmitting to the inside of the case. For this reason, the tubular wall may extend in the direction in which the tubular portion of the case extends.

The first wall portion with the tubular shape may be located at a center portion of the sealing plate. The flange portion may have a shape corresponding to the opening of the case. In case where the case has a cylindrical shape, the first wall portion with the tubular shape and the flange portion may have concentric circular shapes when viewed in an axial direction of the first wall portion with the tubular shape. The one end of the first wall portion with the tubular shape is the portion of the first wall portion closest to the flange portion and is also the boundary portion between the flange portion and the first wall portion.

The terminal cap includes a cover portion with a plate shape that closes the opening surrounded by another end (hereinafter, referred to as the tip portion) of the first wall portion with the tubular shape, and a crimp portion connected to a periphery of the cover. On the other hand, the gasket interposed between the terminal cap and the sealing plate includes a second wall portion with a tubular shape that faces an outer circumferential surface of the sealing plate, and an annular base interposed between the another end of the first wall portion and the cover portion. Examples of material of the gasket include polypropylene (PP), polyphenylene sulfide (PPS), polybutylene terephthalate (PBT), perfluoroalkoxy alkane (PFA), and polyether ether ketone (PEEK). The tip portion of the first wall portion with the tubular shape is the portion that protrudes most largely from the flange portion with respect to a main surface of the flange portion. An opening surrounded by this tip portion has a circular shape, for example; therefore, the plate shaped cover portion closing the tip portion may have a circular shape. That is, the cover portion may have a disk shape.

The crimp portion of the terminal cap presses and compresses the gasket. Such compression causes the terminal cap per se to be fixed to the first wall portion of the sealing plate via the gasket, and prevents fluid (gases and an electrolytic solution) inside the case from leaking from between the sealing plate and the terminal cap to the outside. More specifically, the crimp portion includes a third wall portion with a tubular shape that surrounds at least a part of the second wall portion of the gasket with the tubular shape. The third wall portion presses the second wall portion inward in the radial direction of the first wall portion, thereby compressing the second wall portion. The third wall portion may have no crimp portion. For example, a clearance between the third wall portion and the first wall portion may be smaller than the thickness (dimension in radial direction D) of the second wall portion, thereby causing the first wall portion and third wall portion to compress the second wall portion.

The crimp portion may include a hook portion that is bent and extended from the third wall portion to the second wall portion. The hook portion may bend in a hook shape so as to bite the second wall portion of the gasket. In this case, the hook portion may protrude inward in radial direction D from the tip of the third wall portion. This increases compression of the second wall portion of the gasket, which further increases the strength of fixing of the terminal cap to the first wall portion of the sealing plate via gasket, as well as prevents the fluid inside the case from leaking to the outside.

The annular base of the gasket interposed between the tip portion of the first wall portion of the sealing plate and the cover portion is preferably compressed in the direction in which the tip portion of the first wall portion and the cover portion approach each other. This configuration further prevents the fluid inside the case from leaking to the outside.

The inner diameter of the annular base of the gasket is preferably smaller than the inner diameter of the first wall portion of the sealing plate. This configuration reliably prevents the cover portion of the terminal cap from contacting the first wall portion of the sealing plate, thereby preventing a short-circuit.

An annular end of the second wall portion of the gasket opposite to the annular base may contact both the flange portion and the outer periphery of the first wall portion. This configuration reliably prevents the crimp portion of the terminal cap from contacting the flange portion of the sealing plate, thereby preventing a short-circuit. In this case, the annular end may be compressed in the direction in which the tip portion (or the hook portion) of the third wall portion of the crimp portion and the flange portion approach each other. This configuration prevents the fluid inside the case from leaking.

In the power storage device, the sealing body may be disposed such that the tip portion of the first wall portion protrudes toward the inside of the case. In this case, the pressure of the inside of the case is applied to the flange portion of the sealing plate via the cover portion of the terminal cap. That is, the pressure of the inside of the case is applied in the direction in which the terminal cap approaches the sealing plate (in the direction in which the gasket is compressed). This configuration increases the airtightness of the power storage device. The tip portion of the first wall portion may protrude toward the outside of the case. In this case, the terminal cap and the gasket are disposed such that each of their portions is oriented in the direction opposite to the corresponding direction of the above-described case where the tip portion of the first wall portion protrudes toward the inside of the case. Even this configuration provides the power storage device including a sealing easily processed. Since the cover portion of the terminal cap is disposed at the upper end of the power storage device, a connection member which is used for connecting to other power storage devices, external devices, or external circuits easily accesses the cover portion.

The type of the power storage device is not particularly limited to. Examples of the power storage device include a primary battery, a secondary battery, a lithium-ion capacitor, an electric double-layer capacitor, and a solid electrolytic capacitor. Among them, a non-aqueous electrolyte secondary battery (including an all-solid-state battery) such as a lithium-ion secondary battery with a high energy density can be preferably used.

Hereinafter, the power storage device according to the embodiment of the present invention will be detailed with reference to the drawings. However, the present invention is not limited to the following description.

FIG. 1 is a cross-sectional view illustrating a structure of one example of power storage device 100 according to an exemplary embodiment. Power storage device 100 includes case 110 with a cylindrical shape having opening 101, electrode group 120 including a first electrode and second electrode that are accommodated in case 110, and sealing body 130 that closes opening 101. Sealing body 130 includes sealing plate 131 with an annular shape, terminal cap 132, and insulating gasket 133 interposed between the sealing plate and the terminal cap. Case 110 includes tubular portion 111 with a cylindrical shape, opening-end portion 112 connected to one end of tubular portion 111 and having opening 101, and bottom portion 113 that closes another end of tubular portion 111.

Sealing plate 131 includes first wall portion 1311 with a tubular shape, and flange portion 1312. First wall portion 1311 protrudes toward the inside of the case. A peripheral portion of sealing plate 131 is joined to opening-end portion 112 of case 110 at welding portion WP. Shallow tubular wall 1312W extending toward the inside of the case is disposed at the peripheral portion of flange portion 1312 for facilitating the positioning of sealing body 130 with respect to opening-end portion 112 of the case. Flange portion 1312 is joined to opening-end portion 112 of case 110 by, for example, welding.

Terminal cap 132 includes cover portion 1321 with a plate shape that closes the opening surrounded by first wall portion 1311, and crimp portion 1322 connected to the periphery of the cover portion. Gasket 133 includes second wall portion 1331 with a tubular shape that faces first wall portion 1311, and annular base 1332 interposed between first wall portion 1311 and cover portion 1321. Crimp portion 1322 includes third wall portion 1323 with a tubular shape that surrounds a part of second wall portion 1331 of gasket 133, and hook portion 1324 with a hook shape connected to third wall portion 1323. Third wall portion 1323 presses second wall portion 1331 inward in radial direction D, and hook portion 1324 bites second wall portion 1331 of gasket 133, resulting in engagement with gasket 133.

The inner diameter of annular base 1332 of gasket 133 is smaller than the inner diameter of first wall portion 1311, and annular base 1332 are compressed in the direction (in axial direction A perpendicular to radial direction D) in which first wall portion 1311 and cover portion 1321 approach each other. The engagement of hook portion 1324 with gasket 133 results in ease of maintaining the compression of annular base 1332 in axial direction A.

Annular end 1333 of second wall portion 1331 of gasket 133 opposite to annular base 1332 contacts both flange portion 1312 and the outer periphery of first wall portion 1311, and is compressed in axial direction A between hook portion 1324 and flange portion 1312. The maintaining of compression of annular end 1333 is also made easy by the engagement of hook portion 1324 with gasket 133.

Internal insulating plate 140 is disposed between electrode group 120 and sealing body 130. Internal insulating plate 140 prevents electrode group 120 from contacting and sealing body 130. Predetermined lead hole 141 is provided in internal insulating plate 140. Lead 122 is led out from the first electrode that constitutes electrode group 120, passes through lead hole 141, and is electrically connected to the inner surface of terminal cap 132. Therefore, terminal cap 132 has the same polarity as the first electrode. On the other hand, the second electrode that constitutes electrode group 120 is electrically connected to case 110. Therefore, case 110 has the same polarity as the second electrode.

The structure of the sealing body is not limited to that shown in FIG. 1, and may be changed in various ways. Hereinafter, modified examples of the sealing body will be described with reference to drawings. However, the modified examples are not limited to the following description.

Figure 2:
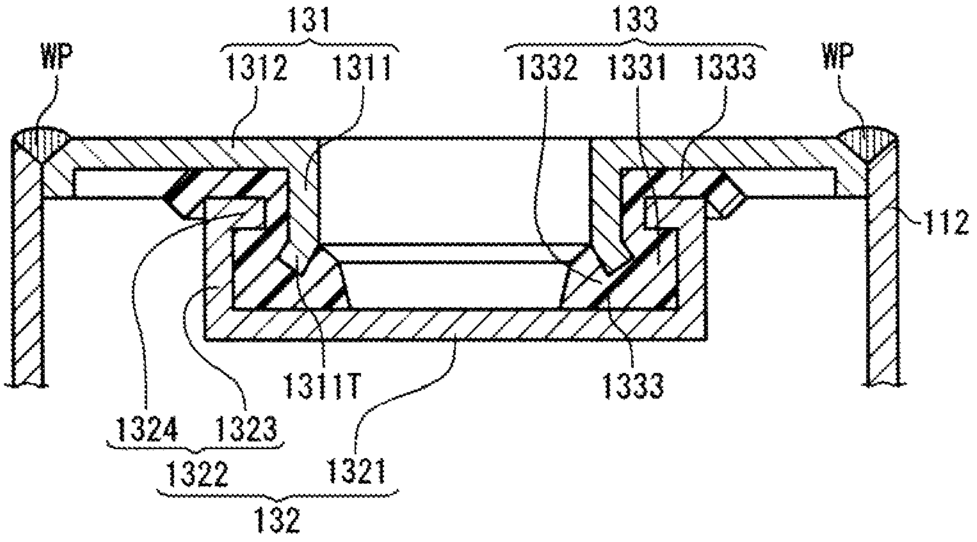
FIG. 2 is a cross-sectional view of a first modified example of a sealing body according to the embodiment of the present disclosure.

FIG. 2 illustrates a first modified example. In FIG. 2, tip portion 1311T of first wall portion 1311 of sealing plate 131 is bent outward along radial direction D of the first wall portion. In this case, second wall portion 1331 of gasket 133 is pressed outward along radial direction D by tip portion 1311T of first wall portion 1311. For this reason, compared to the configuration of tip portion 1311T not pressing gasket 133, second wall portion 1331 is strongly compressed by tip portion 1311T. Since crimp portion 1322 of terminal cap 132 includes hook portion 1324, hook portion 1324 is engaged with tip portion 1311T of first wall portion 1311 via gasket 133, resulting in ease of maintaining of the compression of gasket 133 in axial direction A. This configuration particularly stabilizes the state of compression of annular end 1333 of gasket 133 opposite to annular base 1332 in axial direction A.

Figure 3:
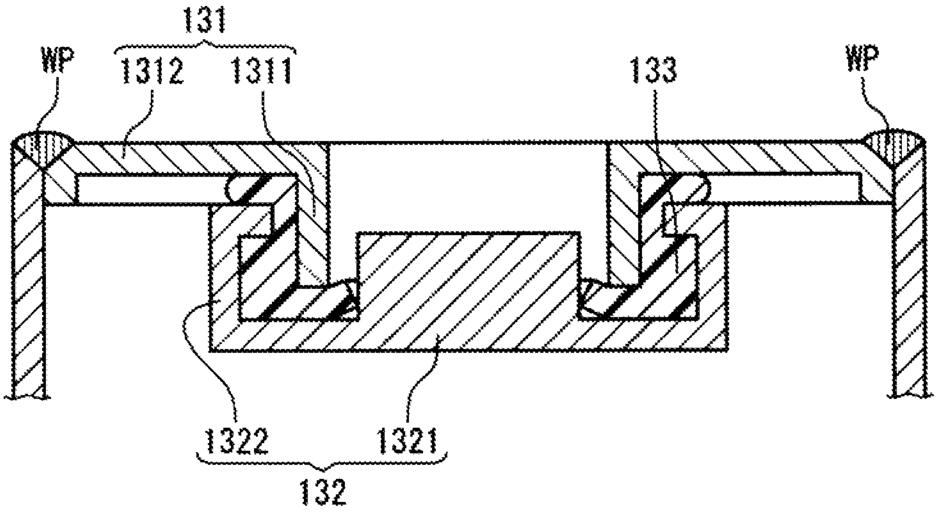
FIG. 3 is a cross-sectional view of a second modified example of the sealing body according to the embodiment of the present disclosure.
Figure 4:
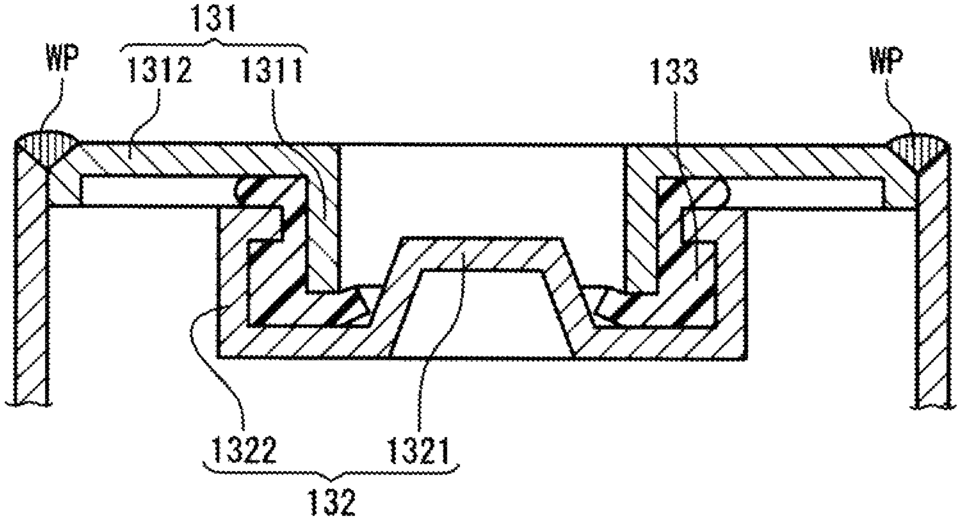
FIG. 4 is a cross-sectional view of a third modified example of the sealing body according to the embodiment of the present disclosure.

FIGS. 3 and 4 illustrate second and third modified examples. In FIGS. 3 and 4, a center portion of cover portion 1321 of terminal cap 132 protrudes toward a hollow in first wall portion 1311. In this case, the center portion of cover portion 1321 is closer in height in axial direction A to flange portion 1312 of sealing plate 131, resulting in ease of electrical connection of the center portion of cover portion 1321 to external devices and the like. In the second modified example, the center portion of cover portion 1321 is formed to have a large thickness, which causes terminal cap 132 to be rigid and of high strength, overall. On the other hand, in the third modified example, a recess is formed in the center portion of cover portion 1321 such that the recess protrudes outward to the outside of the case. The conductive cap having the recess is less in weight than the conductive cap having a cover portion with a thick center portion.

Figure 5:
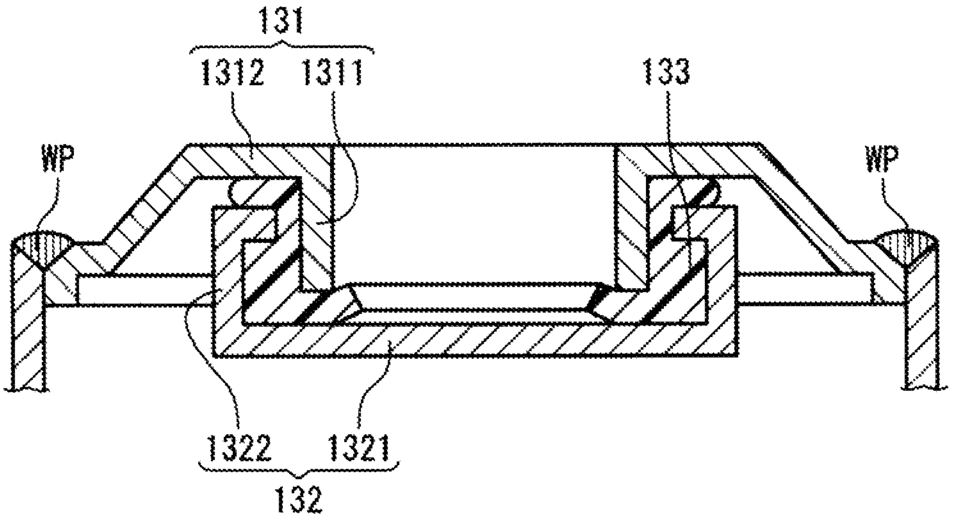
FIG. 5 is a cross-sectional view of a fourth modified example of the sealing body according to the embodiment of the present disclosure.

FIG. 5 illustrates a fourth modified example. In FIG. 5, flange portion 1312 inclines in axial direction A in which sealing body 130 faces the electrode group as the peripheral portion of flange portion 1312 approaches the tip portion of first wall portion 1311. In this case, opening-end portion 112 of case 110 becomes closer in height in axial direction A to cover portion 1321 of terminal cap 132, resulting in ease of electrical connection of the center portion of cover portion 1321 to external devices and the like.

Figure 6:
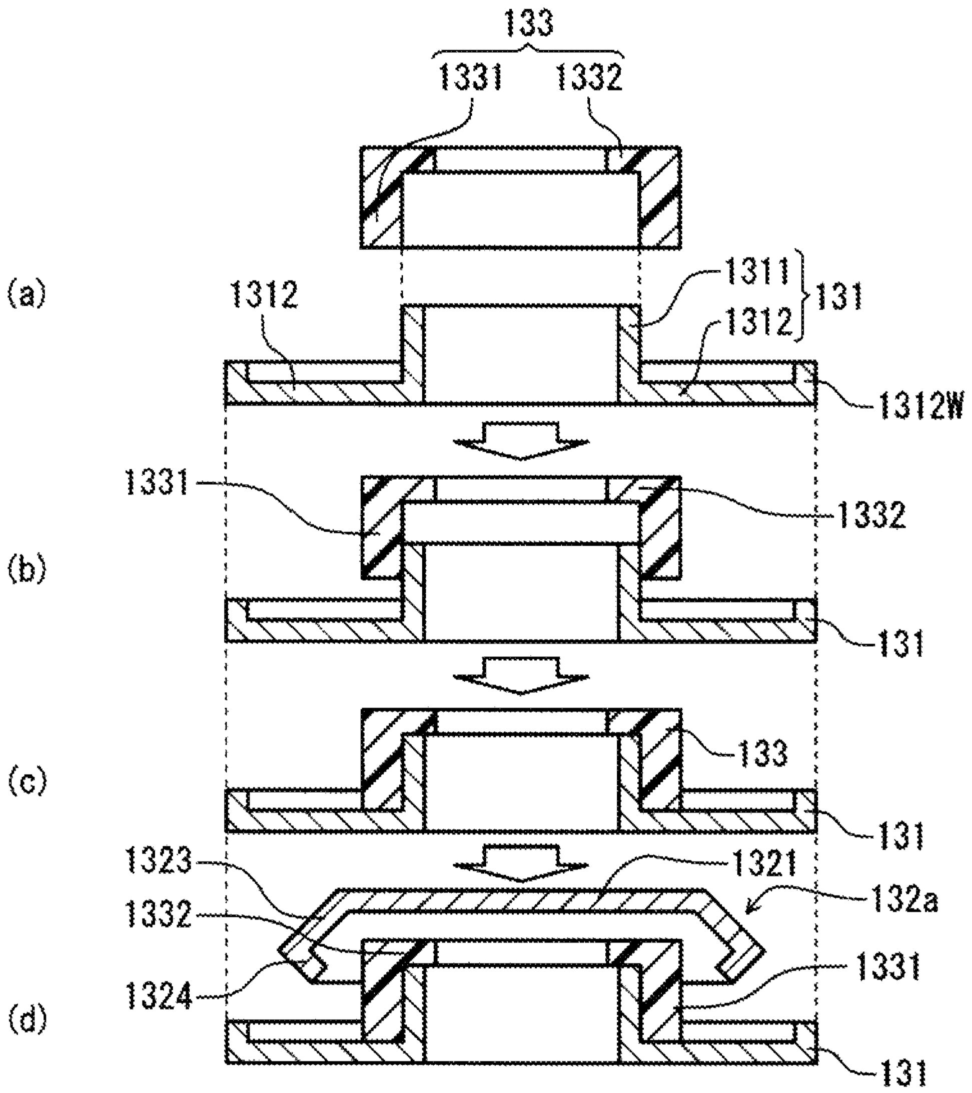
FIG. 6 illustrates a process (first half) of manufacturing the sealing body according to the embodiment of the present disclosure.

Next, a method of manufacturing the sealing body according to the embodiment will be described. FIG. 6 illustrates a process of manufacturing the sealing body.

First, sealing plate 131 and gasket 133 are prepared (FIG. 6(*a*)). The sealing plate incudes first wall portion 1311 with a tubular shape and flange portion 1312. In the illustrated example, the periphery of the flange portion has shallow tubular wall 1312W. Gasket 133 includes second wall portion 1331 with a tubular shape having a hollow accommodating first wall portion 1311 and annular base 1332 with an inner flange shape contacting the tip portion of first wall portion 1311, thus having a tubular shape as a whole.

Next, first wall portion 1311 of sealing plate 131 is inserted into the hollow of second wall portion 1331 of gasket 133, thereby fitting first wall portion 1311 of sealing plate 131 with the hollow of second wall portion 1331 of gasket 133 (FIGS. 6(*b*) and 6(*c*)). The inner diameter of second wall portion 1331 may be slightly larger than the outer diameter of first wall portion 1311. Alternatively, the inner diameter of second wall portion 1331 may be slightly smaller than the outer diameter of first wall portion 1311, thereby causing first wall portion 1311 to be pressed into the hollow of second wall portion 1331. At least one of the outer peripheral surface of first wall portion 1311 and the inner peripheral surface of second wall portion 1331 may taper such that the clearance between these surfaces is gradually narrowed as both components approach each other.

Next, precursor body 132*a* of terminal cap 132 having been provided with hook portion 1324 is prepared. Precursor body 132*a* is formed as follows: After having processed a disk metal plate to form hook portion 1324 therein at the annular boundary between third wall portion 1323 and cover portion 1321, third wall portion 1323 is bent at a predetermined angle to the same side as hook portion 1324. Precursor body 132*a* of terminal cap 132 is placed on gasket 133 such that a recessed surface of precursor body 132*a* faces annular base 1332 of gasket 133 (FIGS. 6(*d*) and 7(*e*)).

Figure 7:
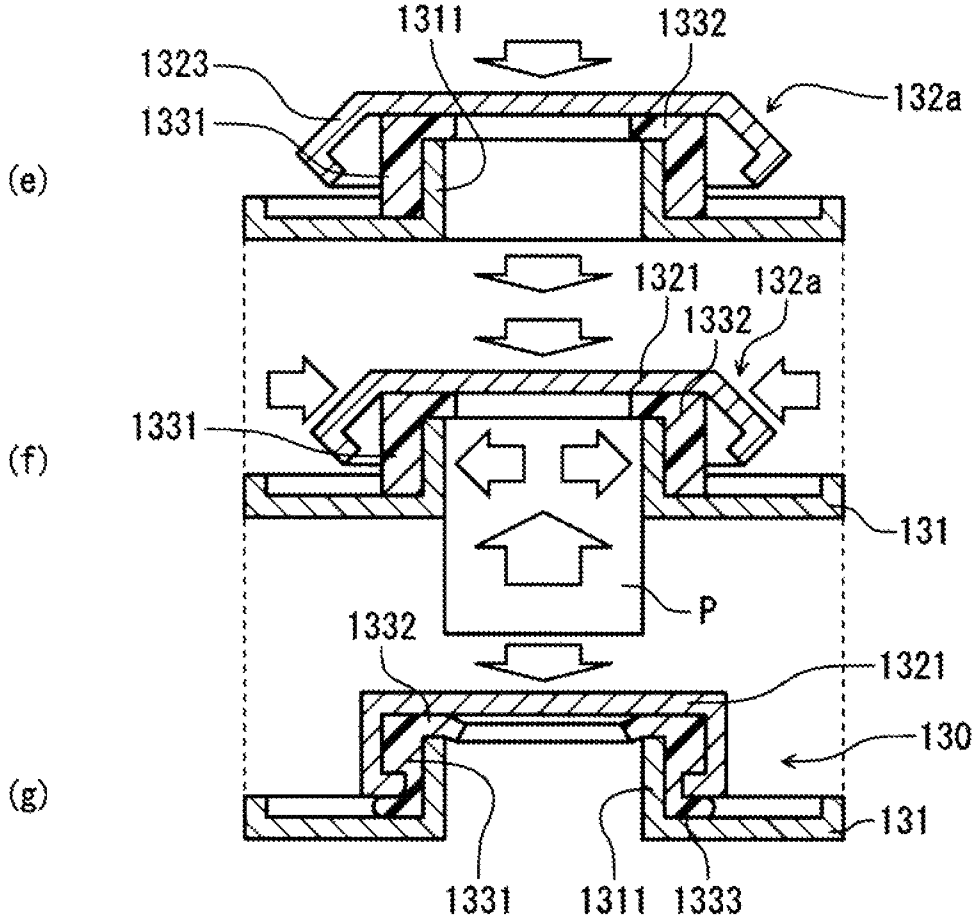
FIG. 7 illustrates the process (second half) of manufacturing the sealing body according to the embodiment of the present disclosure.

Next, punch (metal mold) P is inserted into the hollow of first wall portion 1311 of sealing plate 131. Third wall portion 1323 of precursor body 132*a* of terminal cap 132 is further bent, and third wall portion 1323 is pressed with a predetermined metal mold (not shown) toward second wall portion 1331 of gasket 133. Simultaneously, cover portion 1321 of terminal cap 132 is pressed toward annular base 1332 of gasket 133 with a predetermined metal mold (FIG. 7(*f*)). As a result, sealing body 130 is completed while second wall portion 1331, annular base 1332, and annular end portion 1333 of gasket 133 opposite to the annular base are compressed in respective predetermined directions (FIG. 7(*g*)). That is, terminal cap 132 is crimped onto first wall portion 1311 of sealing plate 131 via gasket 133.

The above descriptions have been made using the power storage devices with a cylindrical shape as examples; however, the present disclosure is usable also for other power storage devices having various shapes (for example, a rectangular shape).

INDUSTRIAL APPLICABILITY

A power storage device according to the present disclosure is particularly suitable for use as a power source of vehicles such as hybrid vehicles and electric vehicles.

REFERENCE MARKS IN THE DRAWINGS

100 power storage device
101 opening
110 case
111 tubular portion
112 opening-end portion
113 bottom portion
120 electrode group
122 lead
130 sealing body
131 sealing plate
1311 first wall portion
1312 flange portion
1312W cylindrical wall
132 terminal cap
1321 cover portion
1322 crimp portion
1323 third wall portion
1324 hook portion
133 gasket
1331 second wall portion
1332 annular base
1333 annular end portion
140 internal insulating plate
141 lead hole

The invention claimed is:

1. A power storage device comprising:

an electrode group including a first electrode and a second electrode;

a case accommodating the electrode group therein, the case having an opening; and a sealing body closing the opening of the case, wherein the sealing body includes an annular sealing plate having an annular shape, a terminal cap, and a gasket provided between the sealing plate and the terminal cap, the gasket having an insulating property, the sealing plate includes a first wall portion having a tubular shape and a flange portion extending from one end of the first wall portion outward in a radial direction of the first wall portion, the terminal cap includes a cover portion having a plate shape and a crimp portion connected with a periphery of the cover portion, the cover portion closing an opening surrounded by another end of the first wall portion, the gasket includes a second wall portion having a tubular shape facing an outer peripheral surface of the first wall portion and an annular base disposed between the another end of the first wall portion and the cover portion, the crimp portion includes a third wall portion having a tubular shape surrounding at least a part of the second wall portion, the third wall portion compresses the second wall portion by pressing the second wall portion inward along the radial direction of the first wall portion, a peripheral portion of the sealing plate is joined to an opening-end portion of the case, the terminal cap is electrically connected to the first electrode, the case is electrically connected to the second electrode, the crimp portion includes a hook portion in which a tip end of the third wall portion is bent and extending toward the second wall portion, and the tip end of the third wall portion bites the second wall portion and is entirely surrounded by the second wall portion.

2. The power storage device according to claim 1, wherein the annular base is compressed in a direction in which the another end of the first wall portion and the cover portion approach each other.

3. The power storage device according to claim 1, wherein an annular end of the second wall portion opposite to the annular base contacts the flange portion and an outer periphery of the first wall portion.

4. The power storage device according to claim 3, wherein the annular end is compressed in a direction in which the hook portion and the flange portion approach each other.

5. The power storage device according to claim 1, wherein the second wall portion is compressed by the another end of the first wall portion such that the another end of the first wall portion is bent outward in the radial direction of the first wall portion and presses the second wall portion outward in the radial direction of the first wall portion.

6. The power storage device according to claim 1, wherein a center portion of the cover portion protrudes toward a hollow of the first wall portion.

7. The power storage device according to claim 1, wherein a peripheral portion of the flange portion inclines to approach the another end of the first wall portion in a direction in which the sealing body faces the electrode group.

8. The power storage device according to claim 1, wherein the peripheral portion of the flange portion extends in a direction in which the sealing body faces the electrode group.

9. The power storage device according to claim 1, wherein an inner diameter of the annular base is smaller than an inner diameter of the first wall portion.

10. The power storage device according to claim 1, wherein the sealing body is disposed to cause the another end of the first wall portion to protrude toward an inside of the case.

11. The power storage device according to claim 1, wherein the hook portion extends in parallel with the cover portion.

12. The power storage device according to claim 11, wherein the second wall portion is interposed between the hook portion and the cover portion.

13. The power storage device according to claim 1, wherein the hook portion is located between portions of the gasket.

* * * * *